United States Patent [19]
Asplund

[11] Patent Number: 5,644,482
[45] Date of Patent: Jul. 1, 1997

[54] HVDC TRANSMISSION SYSTEM WITH MULTIPLE CONVERTER STATIONS

[75] Inventor: Gunnar Asplund, Ludvika, Sweden

[73] Assignee: Asea Brown Boveri AB, Västerås, Sweden

[21] Appl. No.: 673,358

[22] Filed: Jun. 28, 1996

[30] Foreign Application Priority Data

Jul. 6, 1995 [SE] Sweden ................... 9502450

[51] Int. Cl.⁶ ........................................ H02J 3/36
[52] U.S. Cl. ................................ 363/35; 363/37
[58] Field of Search ...................... 363/34, 35, 37

[56] References Cited

U.S. PATENT DOCUMENTS

| | | | |
|---|---|---|---|
| 3,962,623 | 6/1976 | Ekstrom | 363/35 |
| 4,019,115 | 4/1977 | Lips | 363/35 |
| 4,200,907 | 4/1980 | Hausler et al. | 363/35 |
| 4,259,713 | 3/1981 | Flisberg et al. | 363/35 |
| 4,274,043 | 6/1981 | Heitz | 363/35 |
| 4,419,591 | 12/1983 | Irokawa et al. | 363/35 |
| 4,459,492 | 7/1984 | Rogowsky | 363/35 |
| 5,187,651 | 2/1993 | Ekstrom | 363/35 |
| 5,237,494 | 8/1993 | Baader et al. | 363/37 |

FOREIGN PATENT DOCUMENTS

| | | | |
|---|---|---|---|
| WO 90/16104 | 7/1990 | WIPO | H02J 3/36 |
| WO 95/15605 | 4/1995 | WIPO | H02J 3/36 |

*Primary Examiner*—Jeffrey L. Sterrett
*Attorney, Agent, or Firm*—Pollock, Vande Sande & Priddy

[57] ABSTRACT

A power transmission system for high-voltage direct current comprises a rectifier station (1) and an inverter station (2), which are interconnected by a dc connection (4), as well as a third converter station (3) connected between the dc connection and an ac network (3c). The third converter station comprises a converter (3a) connected to the dc connection via a direct-voltage converter (5). The direct-voltage converter comprises at least a first and a second converter stage (8:1, 8:2), each with a positive terminal (TP:1, TP:2), a negative terminal (TM:1, TM:2) and an output terminal (TO:1, TO:2) and comprising a voltage-source converter circuit (V, C1, SL) with at least one extinguishable semiconductor valve (T1, T2). The positive terminal of the second converter stage is connected to the output terminal of the first converter stage and the output terminal of the second converter stage is connected to the negative terminal of the first converter stage.

9 Claims, 3 Drawing Sheets

HVDC TRANSMISSION SYSTEM WITH MULTIPLE CONVERTER STATIONS

TECHNICAL FIELD

The present invention relates to a power transmission system for high-voltage direct current, comprising at least one rectifier station and one inverter station, which are mutually connected by a dc connection, as well as a third converter station connected between the dc connection and an ac network.

By a voltage-source converter circuit is meant in this context a controllable voltage-transforming circuit with one positive, one negative and one output terminal, which occurs as a stiff direct-voltage source between the positive and negative terminals. Between the output and negative terminals, the converter circuit exhibits a controllable direct voltage, the value of which is equal to or lower than the voltage between the positive and negative terminals.

By an extinguishable semiconductor valve is meant in this context a set, defined by two terminals, of one or more extinguishable power semiconductor devices, electrically operating as one unit and having the property of being able to carry current in one direction.

By an extinguishable power semiconductor device is meant a power semiconductor device which can be brought into a conducting as well as a non-conducting state by means of control signals supplied to a control input. Examples of such extinguishable power semiconductor devices are so-called gate turn-off thyristors (GTOs), insulated gate bipolar transistors (IGBTs), and MOS-controlled thyristors (MCTs).

By a diode valve is meant in this context a set, defined by two terminals, of one or more diodes, electrically operating as one unit and having the property of being able to carry current in one direction.

By a valve is meant in this context an extinguishable semi-conductor valve with a diode valve connected in an anti-parallel connection.

BACKGROUND ART

In connection with power transmission by means of high-voltage direct current between more than two converter stations, two different principles are known, namely, series connection and parallel connection, respectively, of the converter stations included in the power transmission installation. In a series connection, which means that all the stations are traversed by the same direct current, the power control is performed by voltage control of each one of the stations. However, in practice, this means a relatively limited control range. In a parallel connection of the converter stations, which means that all the stations are connected to the same voltage, the power control is performed by control of the current through the respective converter. This solution gives greater freedom as regards control possibilities but implies that each one of the stations must be designed for full voltage. This is costly, in particular for those cases where the power which is to be tapped from the dc line is relatively low.

U.S. Pat. No. 4,259,713 discloses a converter station for discharging (i.e. tapping off) power from a dc line in a power transmission system for high-voltage direct current. The converter station comprises an inverter designed for a voltage which is considerably lower than the line voltage and which is connected to the dc line via a direct-voltage converter. The direct-voltage converter comprises, in addition to inductive and capacitive components, diodes and a pulse-controlled thyristor. The thyristor may be provided with an oscillation circuit for extinction or, alternatively, be designed as a gate turn-off thyristor.

The direct-voltage converter comprises a large number of components and must be designed for the whole line voltage, which means that it becomes relatively expensive. Since the direct-voltage converter, from the point of view of insulation, must be designed for the whole line voltage, it is not suited to be designed as an enclosed outdoor device, which in many cases is desirable. In case of a fault in the control of the thyristor or in the thyristor itself, resulting in this becoming continuously conducting, the inverter and the components in the direct-voltage converter which are positioned between the thyristor and the inverter are subjected to an increased direct voltage.

SUMMARY OF THE INVENTION

The object of the invention is to provide a power transmission system of the kind stated in the introduction, which is improved with respect to the above-mentioned disadvantages connected with the prior art.

What characterizes a power transmission system according to the invention will become clear from the appended claims.

Advantageous improvements of the invention will become clear from the following description and claims.

BRIEF DESCRIPTION OF THE DRAWINGS

The invention will be explained in more detail by description of embodiments with reference to the accompanying drawings, wherein FIG. 1 schematically shows a single-line diagram of a power transmission system according to the invention, FIG. 2 schematically shows an embodiment of a converter circuit comprised in a direct-voltage converter according to the invention, and FIG. 3 schematically shows a general embodiment of a direct-voltage converter according to the invention.

DESCRIPTION OF THE PREFERRED EMBODIMENTS

Figure 1:
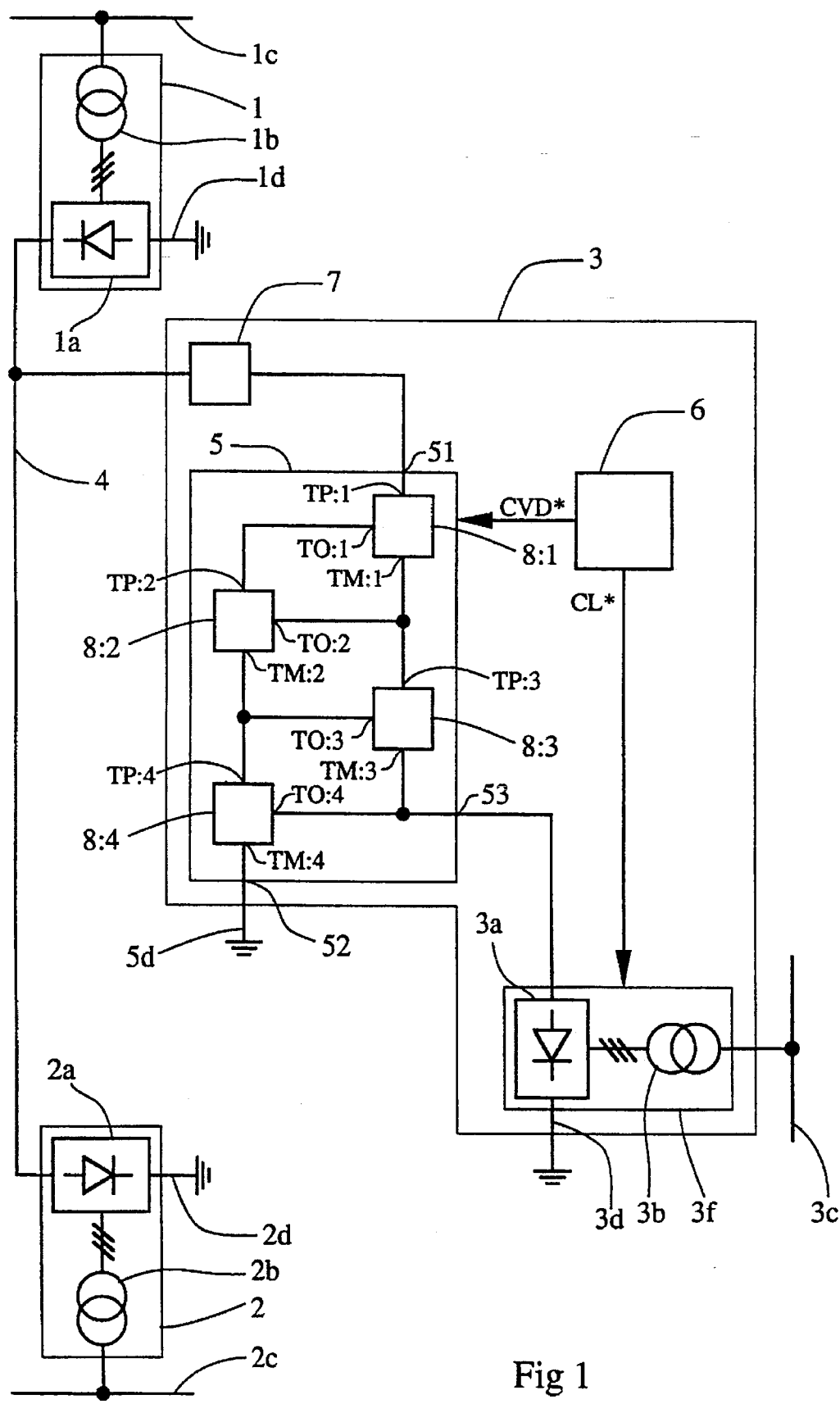

FIG. 1 shows in the form of a single-line diagram a power transmission system for transmission of high-voltage direct current, comprising a rectifier station 1, an inverter station 2, and a third converter station 3. The rectifier and inverter stations, which are designed in a manner known per se, each comprises a converter 1a, 2a, which is connected, by way of a transformer 1b, 2b, to a three-phase ac network 1c, 2c. The rectifier and the inverter are mutually interconnected by a direct-voltage connection 4 constituting a pole in the power transmission, and their circuit is closed via ground, constituting the neutral pole of the power transmission, by means of two ground terminals 1d, 2d. The third converter station comprises a converter 3a, designed in a manner known per se, a direct-voltage converter 5, control equipment 6, and a filter unit 7. The converter 3a is connected, by way of a transformer 3b, to a three-phase ac network 3c. The direct-voltage converter 5 is connected, by a first tap 51, through the filter unit 7 to the direct-voltage connection 4 and, by a second tap 52, to a ground terminal 5d. The converter 3a is connected, by one of its direct-voltage taps, to a third tap 53 on the direct-voltage converter and, by its other direct-voltage tap, to a ground terminal 3d. The control equipment 6 delivers control signals CL* to the converter 3a in order to control the converter in some conventional way known in the art, and delivers control signals CVD* to the direct-voltage converter, which control signals will be described in more detail below. The rectifier and inverter stations 1 and 2, respectively, are controlled in some conventional way known in the art by means of control equipment (not shown in the figures).

The direct-voltage converter comprises a first, a second, a third and a fourth converter stage 8:1, 8:2, 8:3, 8:4, respectively, each with a positive terminal TP:1, TP:2, TP:3, TP:4, a negative terminal TM:1, TM:2, TM:3, TM:4 and an output terminal TO:1, TO:2, TO:3, TO:4, respectively. The positive terminal TP:1 of the first converter stage is connected to the first tap 51 of the direct-voltage converter and the negative terminal TM:4 of the fourth converter stage is connected to the second tap 52 of the direct-voltage converter. The output terminal TO:4 of the fourth converter stage is connected to the third tap 53 of the direct-voltage converter. The first and second converter stages are mutually connected such that the positive terminal TP:2 of the second converter stage is connected to the output terminal TO:1 of the first converter stage, and the output terminal TO:2 of the second converter stage is connected to the negative terminal TM:1 of the first converter stage. Further, the positive terminal TP:3 of the third converter stage is connected to the output terminal TO:2 of the second converter stage, and the output terminal TO:3 of the third converter stage is connected to the negative terminal TM:2 of the second converter stage. Finally, the positive terminal TP:4 of the fourth converter stage is connected to the output terminal TO:3 of the third converter stage, and the output terminal TO:4 of the fourth converter stage is connected to the negative terminal TM:3 of the third converter stage.

Figure 2:
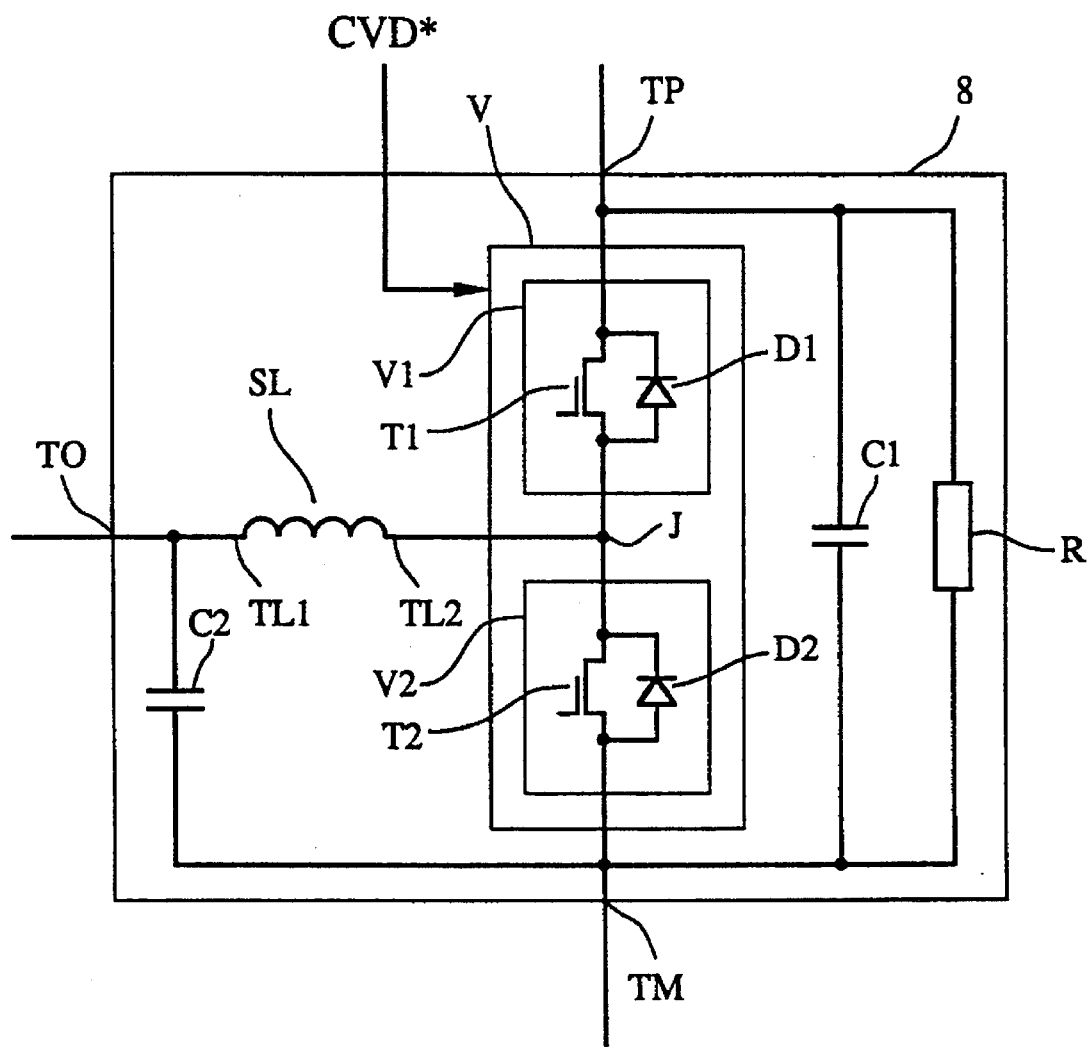

Each one of the converter stages comprises a voltage-source converter circuit which is connected between the positive, negative and output terminals and of which one embodiment is shown in FIG. 2.

The converter circuit comprises a valve circuit V which in turn comprises a first valve V1 and a second valve V2. The valves are mutually series-connected and have a common connection point J. Each one of the valves V1 and V2 comprises an extinguishable semiconductor valve T1, T2, respectively, marked in the figure by a so-called insulated gate bipolar transistor (IGBT), and a diode valve connected thereto in an antiparallel connection, marked in the figure by a diode D1, D2, respectively. The series connection between the valves is made such that the diodes have the same conducting direction. The series connection of the two valves V1 and V2 is connected between the positive terminal TP and the negative terminal TM of the converter stage. A reactor SL with a substantially inductive impedance is connected, by a first tap TL1, to the connection point J and, by a second tap TL2, to the output terminal of the converter stage. A capacitor C1 is connected between the positive and negative terminals of the converter stage and is chosen such that the converter circuit during normal operation occurs as a voltage-source circuit. A high-ohmic resistor R is connected in parallel with the capacitor C1 and a filter capacitor C2 is connected between the output and negative terminals.

A control device CM arranged in the control equipment 6 generates control signals, marked in the figure by a control vector CVD*, containing information to bring the transistors in the valves V1 and V2 into conducting and non-conducting states, respectively. The control signals are supplied to the valve circuit V for control of the valves V1 and V2 in some conventional way known in the art, which is not shown in detail in the figure. The control signals are generated in such a way that each of the valves V1 and V2 are controlled so as to complement each other with a chosen frequency $f_{vs}$, that is, at the same time as a signal is generated which causes the transistor in the valve V1 into the conducting state, another signal is generated which causes the transistor in the valve V2 into the non-conducting state. The positive and negative terminals will thus alternately be connected to the connection point J, and since the reactor SL is assumed to have a substantially inductive impedance, the output terminal will, from a direct-voltage point of view, essentially assume the same potential relative to the negative terminal as the connection point J.

In a preferred embodiment of the invention, the control signals are generated such that the transistors in the valves V1 and V2, respectively, are caused to conduct for mutually equally long intervals, that is, each one of the transistors conducts for half the period that corresponds to the frequency $f_{sv}$. In this way, the time mean value of the voltage between the output terminal and the negative terminal, that is, the voltage across the capacitor C1, becomes equal to half the voltage between the positive and negative terminals.

The frequency $f_{sv}$ may advantageously be chosen to be higher than the system frequency of the ac network by an order of magnitude of one to two powers of ten. The capacitor C1 and the reactor SL are advantageously dimensioned such that the amplitude of harmonics in capacitor voltage and reactor current, respectively, is limited to 10 to 20% of the nominal values of the mentioned voltage and current, respectively.

It is to be understood that the control vector CVD* is supplied to all the converter stages comprised in the direct-voltage converter 5. Thus, in the preferred embodiment, each of these converter stages exhibits, between their respective output and negative terminals, a voltage equal to half the voltage between their respective positive and negative terminals.

Figure 3:
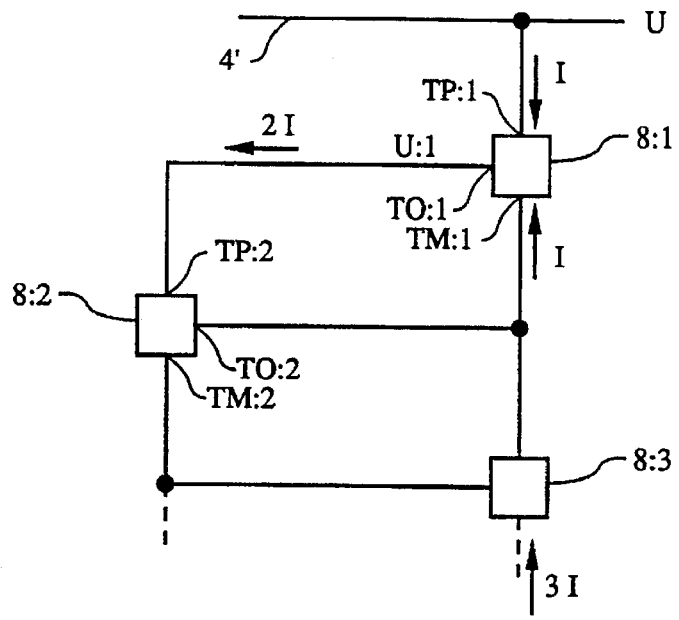
Figure 3:
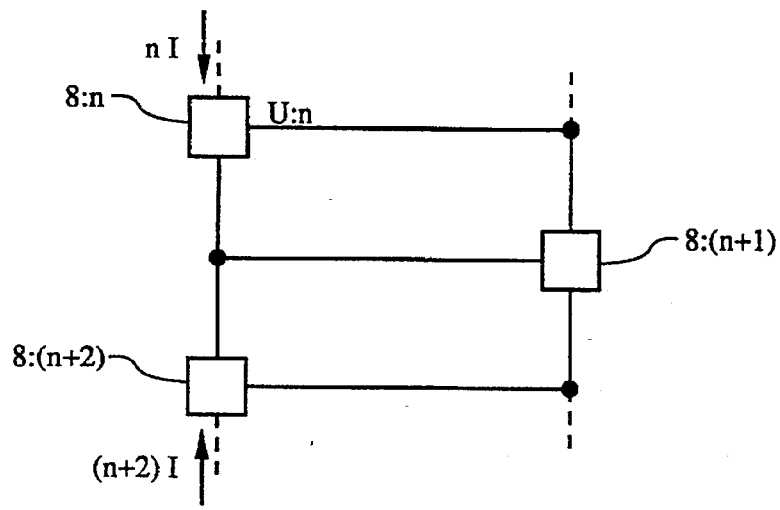
Figure 3:
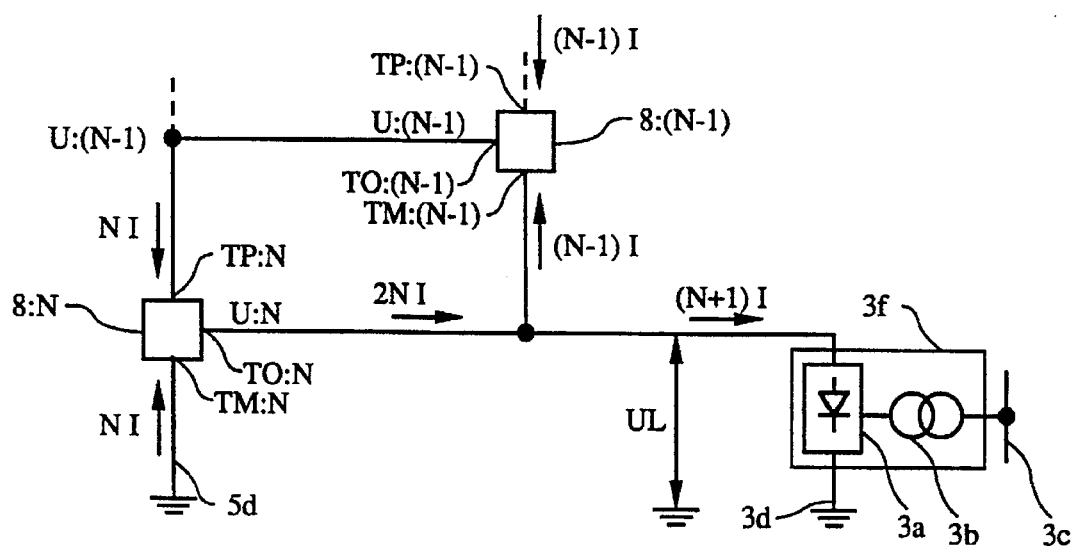

FIG. 3 shows the general configuration of a direct-voltage converter according to the invention. It comprises at least two converter stages and in FIG. 3 the number of converter stages is equal to N. The first converter stage 8:1 is connected with its positive terminal TP:1 to a direct-voltage carrying conductor 4' with the voltage U in relation to ground potential. The N'th converter stage 8:N is connected with its negative terminal TM:N to ground potential, marked by a ground terminal 5d. In order not to overburden the figure, the positive, negative, and output terminals are marked only at the first, the second, the (N−1)th and the N'th converter stages, but it is to be understood that all the converter stages are mutually connected in the way described above. Further, at each of the output terminals of the converter stages in the figure, the voltage U:1, ..., U:n, ..., U:(N−1), U:N between the respective output terminal and ground is marked. From the conductor 4' a direct current I flows to the positive terminal of the first converter stage and the figure further shows the currents which flow to positive terminals in the first, the n'th, the (N−1)th and the N'th converter stages and which flow to negative terminals in the first, the third, the (n+2)th, the (N−1)th and the N'th converter stages. A load 3f is connected between the output terminal TO:N of the N'th converter stage and the ground terminal 3d, which ground terminal is connected to the negative terminal TM:N of the N'th converter stage via the ground terminal 5d. The load comprises the converter 3a which is connected, by way of the transformer 3b, to the three-phase ac network 3c.

For each of the converter stages, the sum of the currents through all the terminals is zero. Especially when the valves V1 and V2 are controlled such that the voltage between the output and negative terminals of the converter stages is equal to half the voltage between the positive and negative terminals, the currents flowing through the positive and negative terminals are equal in magnitude, as marked in connection with the first and N'th converter stages. The current which flows through the output terminal thus becomes twice as large as the current through the positive terminal.

The voltage U:n at the output terminal of the n'th converter stage becomes U:n=U[N−(n−1)]/[N+1].

The voltage across the load 3f thus becomes U/[N+1] and to the load the current I*[N+1] flows.

FIG. 3 shows a power flow from the conductor 4' to the load 3f, that is, in an application as illustrated in FIG. 1, tapping of power from the direct-voltage connection 4 to the third converter station. The embodiment of the converter circuit described with reference to FIG. 2 also allows a power flow in the opposite direction, that is, supply of power to the direct-voltage connection 4 from the third converter station.

In case only tapping of power from the direct-voltage connection 4 occurs, the extinguishable semiconductor valve T2 in the valve V2 may be eliminated such that the valve V2 will consist of a diode valve. Inversely, in those cases where only supply of power to the direct-voltage connection 4 occurs, the extinguishable semiconductor valve T1 in the valve V1 may be eliminated such that the valve V1 will consist of a diode valve.

In a further improvement of the invention, the control device 6 is adapted to generate, to the first extinguishable semiconductor valves of the respective converter stage, control signals which are mutually complementary, such that the first and second converter stages in the first extinguishable semiconductor valve in one converter stage are in the conducting state when the first extinguishable semiconductor valve in the second converter stage is in the non-conducting state, and, in an analogous manner, mutually complementary control signals for the first semiconductor valves of the second and third converter stages, etc. This means, as will be clear on a comparison between FIGS. 2 and 3, that, between the dc conductor 4' and ground, always at least half of the semiconductor valves are in the non-conducting state. This reduces the risk of through-conduction in the direct-voltage converter.

The invention also provides a modularization of the direct-voltage converter in that it may be adapted to comprise an optional number of mutually identical converter stages. Each one of the converter stages may be dimensioned for an optional fraction of the voltage of the power transmission system and hence be designed with an optimum operating voltage for the direct-voltage converter as a whole. This makes possible, inter alia, that each one of the converter stages may be enclosed in a separate enclosure suitable for outdoor erection. Only the enclosure for the converter stage which is connected to the conductor 4' (the dc connection of the power transmission) need thus be insulated against ground for full voltage whereas the other enclosures may be insulated against ground for successively lower voltages.

The filter unit 7 may be adapted, in a manner known per se, to comprise breaking elements and protective equipment for connection and disconnection of the third converter station.

The invention is not limited to the embodiments shown but a plurality of modifications are feasible within the scope of the inventive concept. Thus, the semiconductor valves may be adapted to comprise other kinds of extinguishable power semiconductor devices than the transistor shown.

The load 3f may, according to the circumstances, be in the form of, for example, a voltage-source converter based on pulse-width modulation technique, connected either directly by way of a transformer to the ac network 3c, or in the form of a converter which is line-commutated from the ac network 3c.

The converter 3a may, for example, be controlled in current control whereas the control member 6 may be adapted to generate, at least for one of the converter stages, control signals which in dependence on a sensed load change achieve a transient change of the voltage UL across the load for compensation of the load change.

In case the power transmission system is of two-pole design, the filter unit 7 may be adapted to comprise a pole-changing switch such that the direct-voltage converter may be connected to one of the poles of the power transmission.

I claim:

1. A power transmission system for high-voltage direct current, comprising at least one rectifier station (1) and one inverter station (2), which are interconnected by a dc connection (4), as well as a third converter station (3) connected between the dc connection and an ac network (3c), which converter station comprises a converter (3a) connected to the dc connection via a direct-voltage converter (5), characterized in that the direct-voltage converter comprises at least a first and a second converter stage (8:1, 8:2), each with a positive terminal (TP:1, TP:2), a negative terminal (TM:1, TM:2) and an output terminal (TO:1, TO:2) and comprising a voltage-source converter circuit (V, C1, SL) with at least one extinguishable semiconductor valve (T1, T2), the positive terminal of the second converter stage being connected to the output terminal of the first converter stage and the output terminal of the second converter stage being connected to the negative terminal of the first converter stage.

2. A power transmission system according to claim 1, characterized in that the direct-voltage converter further comprises at least a third converter stage (8:3) of the same kind as the first one, the positive terminal (TP:3) of the third converter stage being connected to the output terminal of the second converter stage and the output terminal (TO:3) of the third converter stage being connected to the negative terminal of the second converter stage.

3. A power transmission system according to claim 1, characterized in that each one of the converter stages comprises a first extinguishable semiconductor valve (T1) with a first diode valve (D1) connected thereto in an antiparallel connection, said semiconductor valve being connected in series at a common connection point (J) with a second diode valve (D2), and that the series connection thus formed is connected between said positive terminal and said negative terminal, that a capacitor (C1) is connected between said positive terminal and said negative terminal and that a reactor (SL) with an essentially inductive impedance is connected between the common connection point and said output terminal.

4. A power transmission system according to claim 1, wherein the direct-voltage converter comprises a control device (CM) for control of the extinguishable semiconductor valves included in the direct-voltage converter, characterized in that the control device generates mutually complementary control signals (CVD*) to said first extinguishable semiconductor valves of the first and second converter stages, such that the first extinguishable semiconductor valve in one converter stage is in the conducting state when the first extinguishable semiconductor valve in the other converter stage is in the non-conducting state.

5. A power transmission system according to claim 2, characterized in that a control device generates mutually complementary control signals to said first extinguishable semiconductor valves of the second and third converter stages, such that the first extinguishable semiconductor valve in one converter stage is in the conducting state when the first extinguishable semiconductor valve in the other converter stage is in the non-conducting state.

6. A power transmission system according to claim 3, characterized in that in each of the converter stages, a second extinguishable semiconductor valve (T2) is connected in an antiparallel connection to the second diode valve and that a control device generates mutually complementary control signals to said first and second semiconductor valves of the first and second extinguishable semiconductor valves, such that one is in the conducting state when the other is in the non-conducting state.

7. A power transmission system according to claim 1, characterized in that a control device generates mutually complementary control signals for one semiconductor valve, such that the duration of its conducting state is equal to the duration of its non-conducting state.

8. A power transmission system according to claim 1, wherein the dc connection comprises one pole (4) and one neutral pole (1d, 2d), characterized in that the positive terminal of one converter stage is connected to said pole and that the negative terminal of another converter stage is connected to the neutral pole and that the converter in the third converter station is connected between an output terminal and a negative terminal of the last-mentioned converter stage.

9. A power transmission system according to claim 1, characterized in that at least one of the converter stages is enclosed in an enclosure for outdoor erection.

\* \* \* \* \*

UNITED STATES PATENT AND TRADEMARK OFFICE
CERTIFICATE OF CORRECTION

PATENT NO. : 5,644,482
DATED : July 1, 1997
INVENTOR(S) : ASPLUND

It is certified that error appears in the above-identified patent and that said Letters Patent is hereby corrected as shown below:

Column 6, lines 27-28, please change "characterized in that" to ---wherein---.

Column 6, line 39, please change "characterized in that" to ---wherein---.

Column 6, line 47, please change "characterized in that" to ---wherein---.

line 52, delete "that".

line 54, change "that" to ---wherein---.

line 55, delete "that".

Column 6, lines 62-63, please change "characterized in that" to ---wherein---.

Column 7, line 4, please change "characterized in that" to ---wherein---.

Column 7, line 12, please change "characterized in that" to ---wherein---.

line 14, change "that" to ---wherein---.

Column 8, line 2, please change "characterized in that" to ---wherein---.

Column 8, line 8, please change "characterized in that" to ---wherein---.

line 10, change "that" to ---wherein---.

UNITED STATES PATENT AND TRADEMARK OFFICE
CERTIFICATE OF CORRECTION

PATENT NO. : 5,644,482
DATED : July 1, 1997
INVENTOR(S) : ASPLUND

It is certified that error appears in the above-identified patent and that said Letters Patent is hereby corrected as shown below:

Column 8, line 16, please change "characterized in that" to ---wherein---.

Signed and Sealed this

Twenty-third Day of December, 1997

*Attest:*

*Attesting Officer*

BRUCE LEHMAN
*Commissioner of Patents and Trademarks*